US010274156B2

(12) United States Patent
Martoch et al.

(10) Patent No.: US 10,274,156 B2
(45) Date of Patent: Apr. 30, 2019

(54) LIGHT GUIDING OPTICAL SYSTEM

(71) Applicant: Varroc Lighting Systems, s.r.o., Senov u Noveho Jicina (CZ)

(72) Inventors: Jan Martoch, Hranice (CZ); Petr Ferbas, Bohunovice (CZ)

(73) Assignee: Varroc Lighting Systems, s.r.o. (CZ)

( * ) Notice: Subject to any disclaimer, the term of this patent is extended or adjusted under 35 U.S.C. 154(b) by 0 days.

(21) Appl. No.: 15/976,572

(22) Filed: May 10, 2018

(65) Prior Publication Data
US 2018/0335195 A1 Nov. 22, 2018

(30) Foreign Application Priority Data

May 18, 2017 (CZ) .................................. 2017-280

(51) Int. Cl.
*F21V 8/00* (2006.01)
*F21S 41/24* (2018.01)
(Continued)

(52) U.S. Cl.
CPC .............. *F21S 43/40* (2018.01); *F21S 41/24* (2018.01); *F21S 41/334* (2018.01);
(Continued)

(58) Field of Classification Search
CPC ........ F21S 43/40; F21S 43/241; F21S 43/245; F21S 41/24; F21S 41/334; F21S 48/1388;
(Continued)

(56) References Cited

U.S. PATENT DOCUMENTS 6,637,924 B2 * 10/2003 Pelka ..................... G02B 6/001
362/555
7,726,854 B2 6/2010 Bourdin et al.
(Continued)

FOREIGN PATENT DOCUMENTS

CZ    2013-755 A3    4/2015
CZ    306 494 B6    2/2017
(Continued)

OTHER PUBLICATIONS

Search Report from Corresponding Czech Application No. PV 2017-280 dated Feb. 19, 2018 (3 pages).

*Primary Examiner* — Joseph L Williams
*Assistant Examiner* — Jose M Diaz
(74) *Attorney, Agent, or Firm* — Hovey Williams LLP; Joan Optican Herman

(57) ABSTRACT

A light guiding optical system comprising a light guide at least partially formed of an optically transparent material and a light source situated on an input surface of the light guide. The light guide comprises on its front side an output surface for the output of light rays conducted through and out of the light guide, and on its rear side a tooth-like structure to unbind light rays through the output surface out of the light guide. The light guiding optical system further comprises a reflector at least partially formed of an optically transparent material, positioned near the tooth-like structure, and comprising at least two reflective surfaces configured to totally reflect light rays that have escaped from the light guide through the tooth-like structure and to return them to the light guide.

9 Claims, 5 Drawing Sheets

Figure 1:
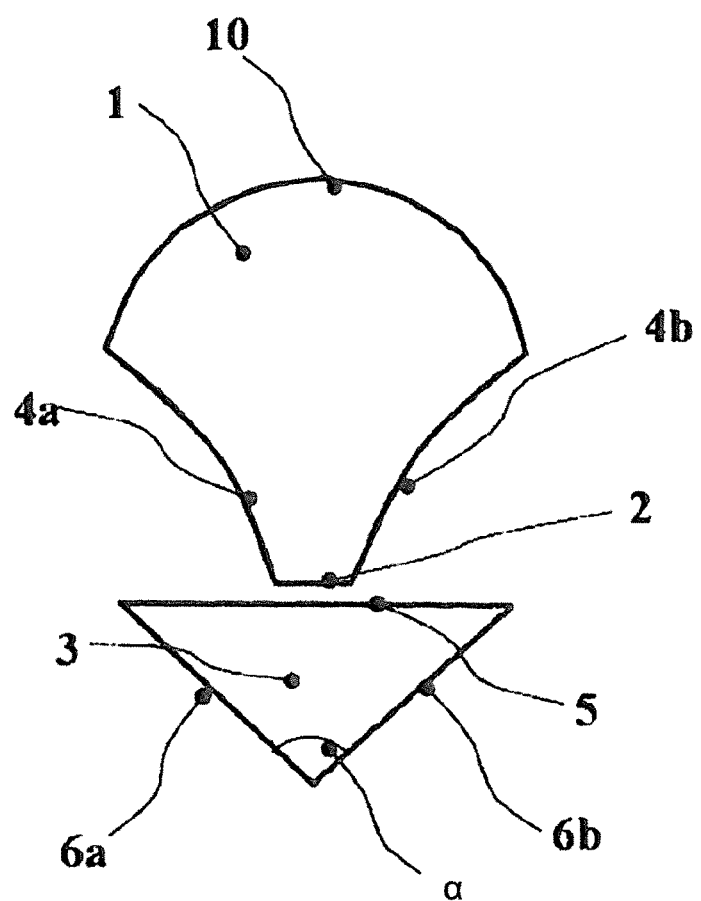

(51) Int. Cl.
*F21S 41/33* (2018.01)
*F21S 43/40* (2018.01)
*F21S 43/241* (2018.01)
*F21S 43/245* (2018.01)

(52) U.S. Cl.
CPC .......... *F21S 43/241* (2018.01); *F21S 43/245* (2018.01); *G02B 6/001* (2013.01)

(58) Field of Classification Search
CPC .......... F21S 48/145; G02B 6/001; F21V 5/04; F21V 5/00; F21V 13/04
See application file for complete search history.

(56) References Cited

U.S. PATENT DOCUMENTS

| | | | | |
|---|---|---|---|---|
| 8,267,565 B2* | 9/2012 | Pan | ............ | G02B 6/001 362/610 |
| 8,820,991 B2* | 9/2014 | Godbillon | ............ | G02B 6/001 362/511 |
| 9,182,095 B2* | 11/2015 | Gomez | ............ | F21S 41/322 |
| 9,254,785 B2* | 2/2016 | Sohizad | ............ | G02B 6/001 |
| 9,551,473 B2 | 1/2017 | Gloss et al. | | |
| 9,581,307 B2 | 2/2017 | Kropac et al. | | |
| 9,715,056 B1* | 7/2017 | Wegner | ............ | G02B 3/0006 |
| 2004/0184286 A1 | 9/2004 | De Lamberterie | | |
| 2007/0121334 A1* | 5/2007 | Bourdin | ............ | G02B 6/0001 362/459 |
| 2011/0242831 A1* | 10/2011 | Okui | ............ | F21S 41/141 362/511 |
| 2016/0102835 A1* | 4/2016 | Baccarin | ............ | F21S 43/145 362/516 |
| 2016/0147004 A1 | 5/2016 | Lee et al. | | |
| 2016/0170119 A1* | 6/2016 | Hao | ............ | A42B 3/044 362/565 |
| 2017/0205042 A1* | 7/2017 | Kim | ............ | F21S 43/13 |
| 2017/0336042 A1* | 11/2017 | Laminette | ............ | B60Q 1/14 |
| 2018/0058661 A1* | 3/2018 | Shim | ............ | F21V 5/04 |
| 2018/0313993 A1* | 11/2018 | Liu | ............ | G02B 6/001 |

FOREIGN PATENT DOCUMENTS

| | | |
|---|---|---|
| WO | 02/40917 A2 | 5/2002 |
| WO | 2011143838 A1 | 11/2011 |

* cited by examiner

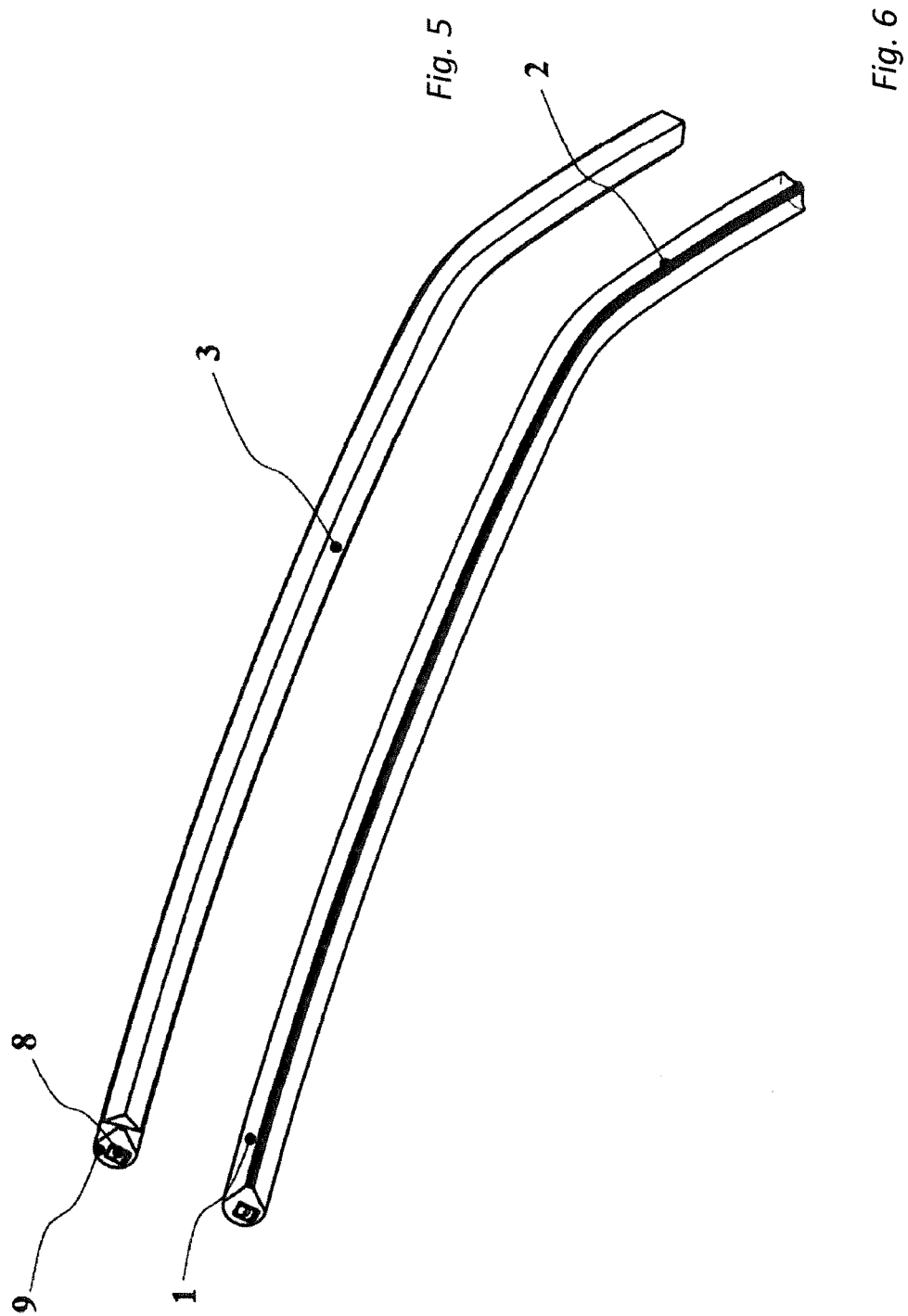

LIGHT GUIDING OPTICAL SYSTEM

FIELD

The present invention relates to a light guiding optical system that comprises a light guide to conduct light emitted by a light source, especially to be used for a light device of a vehicle.

BACKGROUND

A common drawback of known light guides used for light devices of motor vehicles is the fact that a certain part of the light conducted by the light guide escapes from the light guide another way than via the output surface of the light guide without this part of the light being further used, which reduces the light efficiency of the light guide. Therefore, in the field of the design of light guides and light guiding systems, there is a permanent effort to propose such designs that will bring an increase of their light efficiency.

An example of a known design of a light guide that strives to increase light efficiency is the solution described in the patent U.S. Pat. No. 7,726,854. This solution entails using a surface fitted with a diffusion material that is arranged in parallel to the light guide against its reflective surface at a certain distance from the light guide. Light rays that escape out of the light guide through its reflective surface fall onto the diffusion surface and are returned back to the light guide via the reflective surface. Given the diffusion properties of the surface from which the rays are returned to the light guide, homogeneous distribution of the light rays returned to the light guide is achieved all along the length of the light guide. This solution is based on the diffusion properties of the surface from which the light rays return to the light guide.

SUMMARY

Embodiments of the invention solve the above-mentioned problems and provide a distinct advance in light guiding systems. An embodiment of the invention is a light guiding optical system comprising a light guide at least partially formed of an optically transparent material and a light source situated on an input surface of the light guide wherein the light guide comprises on its front side an output surface for the output of light rays conducted through and out of the light guide, and on the light guide's rear side a tooth-like structure to unbind light rays passing out of the light guide via its output surface. The light guiding optical system further comprises a reflector at least partially formed of an optically transparent material, positioned near the tooth-like structure, and including at least two reflective surfaces configured to totally reflect light rays that have escaped from the light guide through the tooth-like structure and to return them to the light guide.

In one embodiment, the light guide is elongated and has a roughly mushroom-like shape in a cross-section along a plane perpendicular to a longitudinal axis of the light guide.

In another embodiment, the reflector comprises an input surface positioned near the tooth-like structure of the light guide for entry of light rays that have escaped from the light guide through the tooth-like structure to the reflector.

In another embodiment, the reflector has a triangular shape in a cross-section along a plane perpendicular to the longitudinal axis of the light guide.

In another embodiment, the reflector is fitted at its corners facing the light guide with protrusions for attachment to side walls of the light guide.

In another embodiment, the reflector has a pentagonal shape in a cross-section along a plane perpendicular to the longitudinal axis of the light guide, the reflector comprising a first inclined surface connecting the input surface to a first one of the reflective surfaces and a second inclined surface connecting the input surface to a second one of the reflective surfaces, the first and second inclined surfaces being inclined with respect to the input surface by a predetermined angle and configured to refract the light rays that have escaped through the tooth-like structure and fallen onto the first surface or the second surface in the direction that is roughly perpendicular to the input surface.

In another embodiment, a distance between the input surface of the reflector and the outer surface of the tooth-like structure of the light guide is between 1 mm and 2 mm.

In another embodiment, the reflective surfaces of the reflector exhibit surface roughness corresponding to mirror gloss.

In another embodiment, the light guide preferably further includes two lateral surfaces having, in a plane perpendicular to a longitudinal axis of the light guide, a roughly circular shape, the tooth-like structure being delimited between lower ends of the lateral surfaces, the lateral surfaces being configured to reflect light rays that propagate along the light guide and fall onto the lateral surfaces.

BRIEF DESCRIPTION OF THE DRAWING FIGURES

Figure 2:
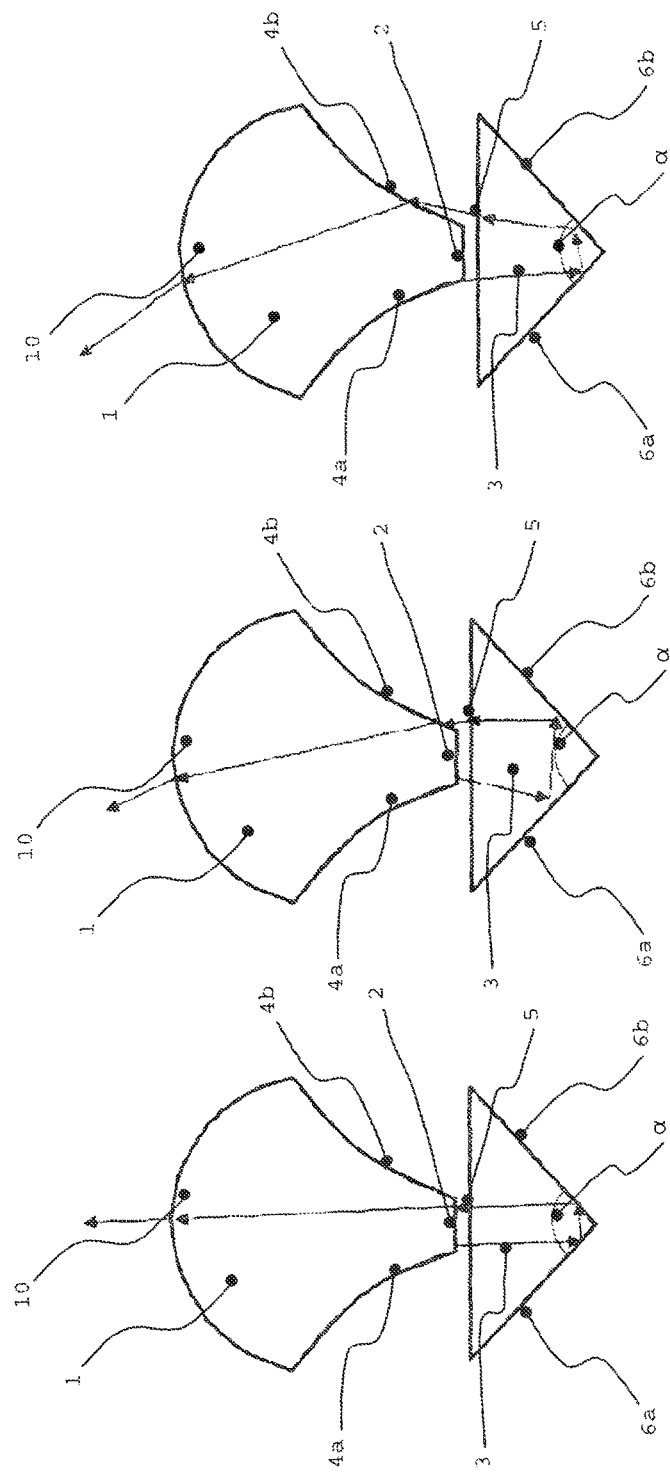
Figure 3:
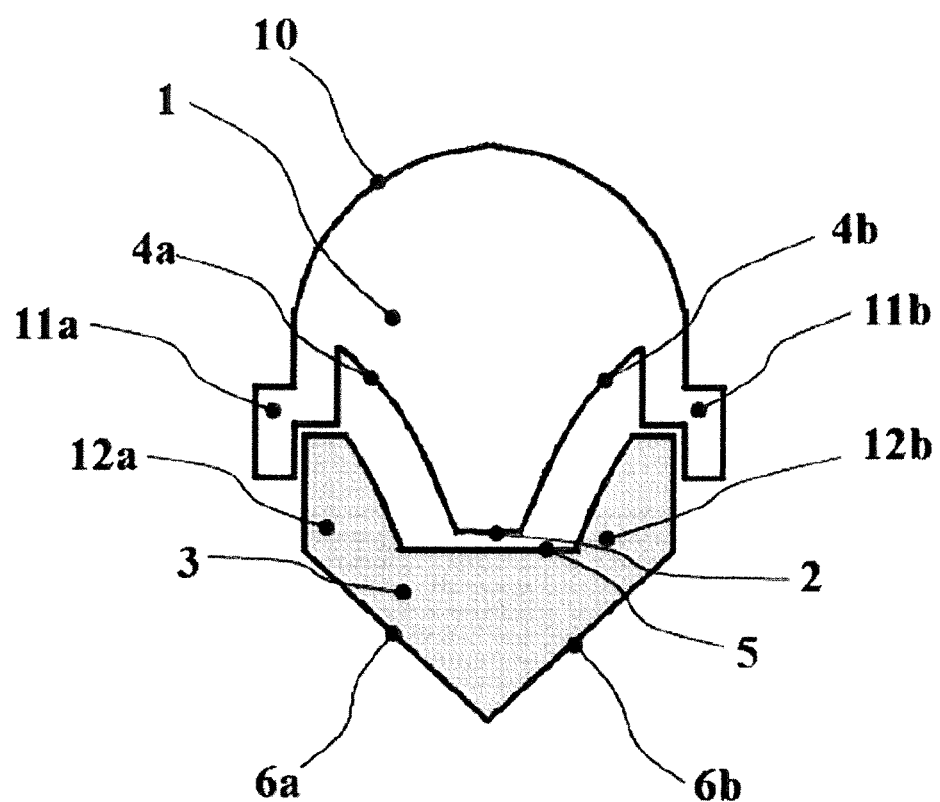
Figure 4:
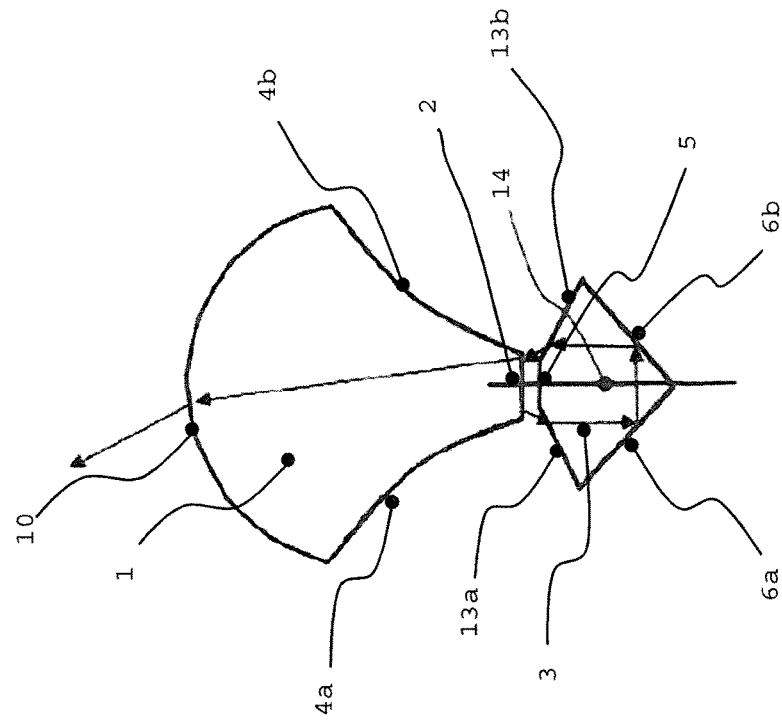
Figure 4:
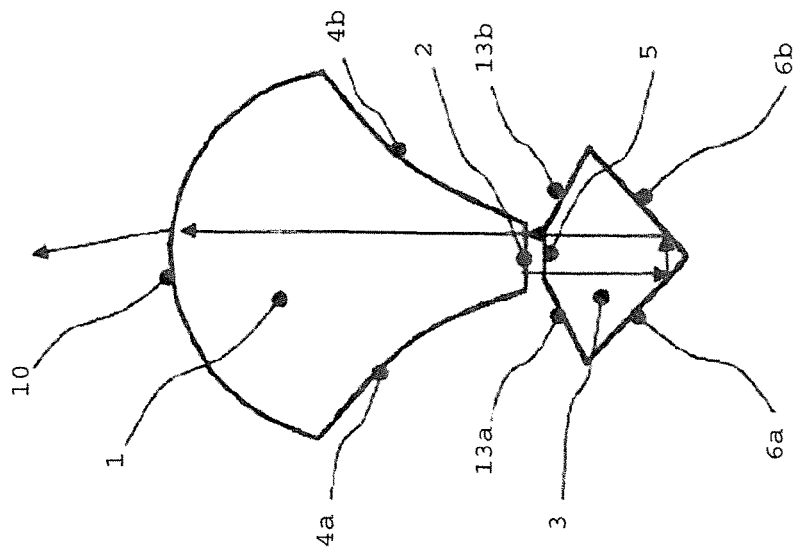

The present invention will be further clarified in more detail with the use of embodiment examples of the invention, referring to the enclosed drawings where:

FIG. 1 shows a cross-section of a light guiding optical system constructed in accordance with an embodiment of the invention, FIG. 2 shows a schematic representation of the advancement of light rays that escaped from the light guide and are returned by the reflector back to the light guide, FIG. 3 shows a cross-section of a light guiding optical system constructed in accordance with another embodiment of the invention, FIG. 4 shows a cross-section of a light guiding optical system constructed in accordance with another embodiment of the invention and depicted with a schematic representation of advancement of light rays, FIG. 5 shows a bottom perspective view of the light guiding optical system of FIG. 1, and FIG. 6 shows a bottom perspective view of the light guide of the light guiding optical system of FIG. 5.

DETAILED DESCRIPTION

Turning to FIGS. 1, 2, 5, and 6, a first embodiment of a light guiding optical system comprises a light guide 1 and a reflector 3 positioned with its input surface 5 near the outer surface of a tooth-like structure 2. In one embodiment, the input surface 5 is spaced from the outer surface of the tooth-like structure 2 with a gap therebetween. The width of this gap is preferably from 1 mm to 2 mm. Alternatively, the input surface 5 may be adjacent the outer surface of the tooth-like structure 2 with no gap therebetween. The light guide 1 is at least partially formed of an optically transparent material and is used to guide light rays produced by the light source 8 (see FIG. 5) situated on an input surface 9 of the light guide 1. The light guide 1 comprises on its front side an output surface 10 for the exit of light rays conducted through and out of the light guide 1.

The body of the reflector 3 is at least partially formed of an optically transparent material and is positioned near the side of the light guide 1 fitted with the tooth-like structure 2, which is used to unbind light rays through the output surface 10 out of the light guide 1. The reflector body comprises at least two reflective surfaces 6a, 6b configured to totally reflect light rays that have escaped from the light guide 1 through the tooth-like structure 2 and to return them back to the light guide 1. FIG. 2 shows the route of light rays returned by the reflector 3 back to the light guide 1. A majority of the light rays are returned to the light guide 1 through the tooth-like structure 2, however a certain minority of the light rays can enter the light guide 1 through lateral surfaces 4a and 4b as well. These lateral surfaces 4a and 4b are configured in such a way for the light rays that are emitted by the light source 8 and advance along the light guide 1 to be reflected by the lateral surfaces 4a and 4b to prevent light rays from escaping from the light guide 1 through the lateral surfaces 4a and 4b. Thus, the lateral surfaces 4a and 4b have a reflective function for rays advancing along the light guide 1. The reflective surfaces 6a, 6b of the reflector 3 are adapted in such a way that they preferably have surface roughness corresponding to mirror gloss, especially with a Ra value lower than 0.5 μm.

The entire body of the light guide 1 may have an elongated shape and in a cross section along a plane perpendicular to its longitudinal axis the light guide 1 has a roughly mushroom-like shape.

FIG. 3 shows another embodiment of the invention. The light guide 1 has a roughly mushroom-like shape in the cross-section again and is fitted with lateral walls 11a and 11b that are used for attachment, e.g. by means of ultrasonic welding, to the protrusions 12a and 12b. The body of the reflector 3 has a triangular cross-section and at its corners facing the light guide 1, the reflector 3 is fitted with protrusions 12a and 12b, which are preferably bosses made e.g. by plastic injection molding as one piece with the reflector body, such that the protrusions 12a and 12b form one integral part with the reflector body.

FIG. 4 shows another embodiment of the invention, using arrows to schematically indicate the route of a light ray through the light guide 1 and reflector 3. The light guide 1 has a roughly mushroom-like shape in the cross-section again. The body of the reflector 3 has a pentagonal cross-section, which can be preferably symmetrical to the axis 14, which preferably leads approximately in the direction of the optical axis of the light guiding system. The reflector body comprises reflective surfaces 6a and 6b, an input surface 5 and inclined surfaces 13a and 13b that connect the input surface 5 with the reflective surfaces 6a and 6b and are inclined with respect to the input surface 5 by a pre-defined angle. This angle can be selected in such a way for the light rays that have escaped through the tooth-like structure 2 from the light guide 1 to refract on the inclined surfaces 13a and 13b to the direction that is roughly parallel to the axis 14. This is to ensure higher efficiency of the subsequent reflection on the reflective surfaces 6a and 6b of the reflector 3.

In the above-discussed embodiments, the reflective surfaces 6a, 6b of the reflector 3 form a rear surface of the reflector 3 and make a pre-defined angle α together. The reflective surfaces 6a, 6b and their position with respect to the light guide 1 as well as their mutual position resulting from the angle α are configured in such a way that on both of these reflective surfaces 6a, 6b the condition of total reflection is met for light rays that have escaped from the light guide 1 through the tooth-like structure 2 and fall onto these reflective surfaces 6a, 6b. The reflective surfaces 6a, 6b are arranged in such a way to reflect said light rays back towards the light guide 1. The input surface 5 through which light rays that have escaped from the light guide 1 enter the reflector 3 at the same time acts as the surface through which light rays after the reflection from the reflective surfaces 6a, 6b exit the reflector 3 and enter the light guide 1 towards the output surface 10. The light guide 1 further comprises lateral surfaces 4a, 4b between the bottom ends of which the area of the tooth-like structure 2 is delimited. The lateral surfaces 4a, 4b preferably have a roughly spherical shape.

As mentioned above, a minority of light rays that have been reflected from the reflective surfaces 6a and 6b return to the light guide 1 by refraction through the lateral surfaces 4a and 4b. However, as high losses occur during this refraction of light through these lateral surfaces 4a and 4b, the light rays that are returned to the light guide 1 through the lateral surfaces 4a and 4b represent a minor part of the total amount of rays returned to the light guide 1.

FIG. 5 shows the light guiding optical system all along its length in the embodiment of FIG. 1. FIG. 6 shows the bottom side of the light guide 1 of FIG. 5 fitted with the tooth-like structure 2.

The preferred embodiments of the invention that are described above are only illustrative and do not restrict the scope of the invention defined in the attached claims. A person skilled in the art is able to implement further changes and modifications that would fall within the scope of the invention as recited in the claims. Having thus described various embodiments of the invention, what is claimed as new and desired to be protected by Letters Patent includes the following:

LIST OF REFERENCE MARKS

1—light guide
2—tooth-like structure
3—reflector
4a, 4b—lateral surface
5—input surface
6a, 6b—reflective surface
α—angle
8—light source
9—input surface
10—output surface
11a, 11b—lateral wall
12a, 12b—protrusion
13a, 13b—inclined surface The inveniton claimed is:
1. A light guiding optical system comprising:
a light guide at least partially formed of an optically transparent material, the light guide including an input surface, an output surface on a front side of the light guide for outputting light rays conducted through the light guide, and a tooth-like structure for unbinding light rays through the output surface passing out of the light guide;
a light source situated on the input surface and configured to emit light rays; and
a reflector at least partially formed of an optically transparent material, the reflector being positioned near the tooth-like structure and comprising at least first and second reflective surfaces, the reflective surfaces being configured to totally reflect light rays that have escaped from the light guide through the tooth-like structure and to return the light rays to the light guide.

2. The light guiding optical system in accordance with claim 1, wherein the light guide is elongated along a longitudinal axis and has a roughly mushroom-like shape in a cross-section along a plane perpendicular to the longitudinal axis.

3. The light guiding optical system in accordance with claim 1, wherein the reflector comprises an input surface positioned near the tooth-like structure of the light guide for entry of light rays that have escaped from the light guide through the tooth-like structure to the reflector.

4. The light guiding optical system in accordance with claim 3, wherein the reflector has a triangular shape in a cross-section along a plane perpendicular to a longitudinal axis of the light guide.

5. The light guiding optical system in accordance with claim 4, wherein the light guide further includes lateral walls and the reflector includes protrusions for attachment to the lateral walls.

6. The light guiding optical system in accordance with claim 3, wherein the reflector has a pentagonal shape in a cross-section along a plane perpendicular to a longitudinal axis of the light guide, the reflector further including a first inclined surface connecting the input surface and the first reflective surface, and a second inclined surface connecting the input surface and the second reflective surface, the inclined surfaces being inclined with respect to the input surface by a predetermined angle and configured to refract light rays that have escaped through the tooth-like structure and fallen onto the inclined surfaces in a direction that is roughly perpendicular to the input surface.

7. The light guiding system in accordance with claims 3, wherein a distance between the input surface of the reflector and the outer surface of the tooth-like structure of the light guide is between 1 mm and 2 mm.

8. The light guiding optical system in accordance with claim 1, wherein the reflective surfaces of the reflector exhibit surface roughness corresponding to mirror gloss.

9. The light guiding optical system in accordance with claim 1, wherein the light guide further includes two lateral surfaces having, in a plane perpendicular to a longitudinal axis of the light guide, a roughly circular shape, the tooth-like structure being delimited between lower ends of the lateral surfaces, the lateral surfaces being configured to reflect light rays that propagate along the light guide and fall onto the lateral surfaces.

* * * * *